US011016592B2

(12) United States Patent
Yin et al.

(10) Patent No.: US 11,016,592 B2
(45) Date of Patent: May 25, 2021

(54) DISPLAY SUBSTRATE, IN CELL TOUCH PANEL AND DISPLAY DEVICE

(71) Applicants: Hefei Xinsheng Optoelectronics Technology Co., Ltd.; BOE Technology Group Co., Ltd., Beijing (CN)

(72) Inventors: Liuyue Yin, Beijing (CN); Ming Zhang, Beijing (CN); Qicheng Chen, Beijing (CN); Haifeng Hu, Beijing (CN); Weijie Ma, Beijing (CN); Zhi Du, Beijing (CN); Ting Zeng, Beijing (CN); Bin Li, Beijing (CN)

(73) Assignees: Hefei Xinsheng Optoelectronics Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/399,259

(22) Filed: Apr. 30, 2019

(65) Prior Publication Data
US 2020/0033976 A1    Jan. 30, 2020

(30) Foreign Application Priority Data
Jul. 25, 2018  (CN) .......................... 201810827826.3

(51) Int. Cl.
*G06F 3/041*    (2006.01)
*G02F 1/1333*   (2006.01)
*G06F 3/044*    (2006.01)

(52) U.S. Cl.
CPC ........ *G06F 3/0412* (2013.01); *G02F 1/13338* (2013.01); *G06F 3/044* (2013.01); *G06F 2203/04107* (2013.01)

(58) Field of Classification Search
CPC .... G06F 3/0412; G06F 3/044; G06F 1/13338; G06F 2203/04107
See application file for complete search history.

(56) References Cited

U.S. PATENT DOCUMENTS

| 2012/0105337 A1* | 5/2012 | Jun .................... G02F 1/133512 345/173 |
| 2016/0011688 A1* | 1/2016 | Wang ....................... G06F 3/044 345/174 |
| 2016/0377898 A1* | 12/2016 | Xu ..................... G02F 1/133345 349/12 |

FOREIGN PATENT DOCUMENTS

| CN | 206411639 U | 8/2017 |
| CN | 107390926 A * | 11/2017 |

OTHER PUBLICATIONS

Chinese Office Action for corresponding application 201810827826.3 dated Dec. 1, 2020.

* cited by examiner

*Primary Examiner* — Sahlu Okebato
(74) *Attorney, Agent, or Firm* — Arent Fox LLP; Michael Fainberg

(57) ABSTRACT

A display substrate, an in cell touch panel and a display device are provided. The black matrix includes at least one first touch electrode and at least one second touch electrode insulated from each other and intersecting with each other, and both the first touch electrode and the second touch electrode are in a grid structure, that is, the first touch electrode and the second touch electrode arranged to intersect with each other are reused as the black matrix.

14 Claims, 16 Drawing Sheets

DISPLAY SUBSTRATE, IN CELL TOUCH PANEL AND DISPLAY DEVICE

CROSS-REFERENCES TO RELATED APPLICATIONS

This application claims priority to Chinese patent application No. 201810827826.3 filed on Jul. 25, 2018, which is incorporated herein by reference in its entirety.

FIELD

The present disclosure relates to the field of touch display technologies, and particularly to a display substrate, an in cell touch panel, and a display device.

BACKGROUND

With the rapid development of the display technologies, the touch panel has been widespread gradually in our life. The touch panel can categorized as the structure thereof into an add on mode touch panel, an on cell touch panel, and an in cell touch panel. The add on mode touch panel is fabricated by fabricating a Liquid Crystal Display (LCD) and the touch panel dividually, and then joining them together, thus resulting in the LCD with a touch function, but the add on mode touch panel is fabricated at a high cost, and there are low transmittance, a large thickness, etc., thereof. In the on cell touch panel, a touch electrode layer is embedded between a Color Filter (CF) substrate and an upper polarizing sheet, that is, touch electrodes are arranged outside the color filter substrate, and thus tend to be scratched. In the in cell touch panel, the touch electrodes are integrated inside the color filter substrate, that is, the touch elements are integrated inside the display panel to thereby reduce the overall thickness thereof, so the in cell touch panel has been widely favored among various panel manufactures.

SUMMARY

In one aspect, an embodiment of the disclosure provides a display substrate. The display substrate includes: a base substrate, and a plurality of color photo-resist layers and a black matrix on the base substrate, an orthographic projection of the black matrix on the base substrate covering orthographic projections of gaps between adjacent color photo-resist layers on the base substrate; wherein the black matrix includes: at least one first touch electrode extending in a first direction, and at least one second touch electrode extending in a second direction, the first touch electrode is insulated from the second touch electrode, and the first direction intersects with the second direction; and each of the at least one first touch electrode and each of the at least one second touch electrode have grid structures.

Optionally in the display substrate according to the embodiment of the disclosure, the first touch electrode is arranged at a different layer from the second touch electrode, and an insulation layer is arranged between the first touch electrode and the second touch electrode.

Optionally in the display substrate according to the embodiment of the disclosure, the black matrix further includes at least one of: a first light-shielding block between adjacent first touch electrodes, and insulated from the first touch electrodes; or a second light-shielding block located between adjacent second touch electrodes, and insulated from the second touch electrodes.

Optionally in the display substrate according to the embodiment of the disclosure, the black matrix further includes at least one of: a first dummy electrode between adjacent first touch electrodes, and insulated from the first touch electrodes; or a second dummy electrode between adjacent second touch electrodes, and insulated from the second touch electrodes.

Optionally in the display substrate according to the embodiment of the disclosure, the black matrix further includes at least one of: a first light-shielding block between adjacent first touch electrode and the first dummy electrode, and insulated from the first touch electrode; or a second light-shielding block between adjacent second touch electrode and the second dummy electrode, and insulated from the second touch electrode.

Optionally in the display substrate according to the embodiment of the disclosure, the first light-shielding block is arranged at a same layer as the second touch electrode; and the second light-shielding block is arranged at a same layer as the first touch electrode.

Optionally in the display substrate according to the embodiment of the disclosure, a line width of the first light-shielding block is more than a line width of a grid of the second touch electrode; and a line width of the second light-shielding block is more than a line width of a grid of the first touch electrodes.

Optionally in the display substrate according to the embodiment of the disclosure, the first touch electrode includes a first blackened metal layer, a first transition layer, a metal layer, a second transition layer, and a second blackened metal layer stacked successively; and the second touch electrode includes a second blackened metal layer, a second transition layer, a metal layer, a second transition layer, and a second blackened metal layer stacked successively.

In another aspect, an embodiment of the disclosure further provides an in cell touch panel. The in cell touch panel includes an array substrate and an opposite substrate, both of which are opposite to each other, a black matrix being arranged on a side of the array substrate facing the opposite substrate, or a side of the opposite substrate facing the array substrate, wherein the black matrix includes: at least one first touch electrode extending in a first direction, and at least one second touch electrode extending in a second direction, the first touch electrode is insulated from the second touch electrode, and the first direction intersects with the second direction; and each of the at least one first touch electrode and each of the at least one second touch electrode have grid structures.

Optionally in the in cell touch panel according to the embodiment of the disclosure, the first touch electrode is arranged at a different layer from the second touch electrode, and an insulation layer is arranged between the first touch electrode and the second touch electrode.

Optionally in the in cell touch panel according to the embodiment of the disclosure, the black matrix further includes at least one of: a first light-shielding block between adjacent first touch electrodes, and insulated from the first touch electrodes; or a second light-shielding block between adjacent second touch electrodes, and insulated from the second touch electrodes.

Optionally in the in cell touch panel according to the embodiment of the disclosure, the black matrix further includes at least one of: a first dummy electrode between adjacent first touch electrodes, and insulated from the first touch electrodes; or a second dummy electrode between adjacent second touch electrodes, and insulated from the second touch electrodes.

Optionally in the in cell touch panel according to the embodiment of the disclosure, the black matrix further includes at least one of: a first light-shielding block between adjacent first touch electrode and the first dummy electrode, and insulated from the first touch electrode; or a second light-shielding block between adjacent second touch electrode and the second dummy electrode, and insulated from the second touch electrode.

Optionally in the in cell touch panel according to the embodiment of the disclosure, the first light-shielding block is arranged at a same layer as the second touch electrode; and the second light-shielding block is arranged at a same layer as the first touch electrode.

Optionally in the in cell touch panel according to the embodiment of the disclosure, a line width of the first light-shielding block is more than a line width of a grid of the second touch electrode; and a line width of the second light-shielding block is more than a line width of a grid of the first touch electrode.

Optionally in the in cell touch panel according to the embodiment of the disclosure, the first touch electrode includes a first blackened metal layer, a first transition layer, a metal layer, a second transition layer, and a second blackened metal layer stacked successively; and the second touch electrode includes a first blackened metal layer, a first transition layer, a metal layer, a second transition layer, and a second blackened metal layer stacked successively.

Optionally in the in cell touch panel according to the embodiment of the disclosure, further includes a color photo-resist layer; and both the color photo-resist layer and the black matrix are on a side of the array substrate facing the opposite substrate, or both the color photo-resist layer and the black matrix are on a side of the opposite substrate facing the array substrate.

In another aspect, an embodiment of the disclosure further provides a display device including the in cell touch panel according to the embodiment of the disclosure.

DETAILED DESCRIPTION

Figure 1A:
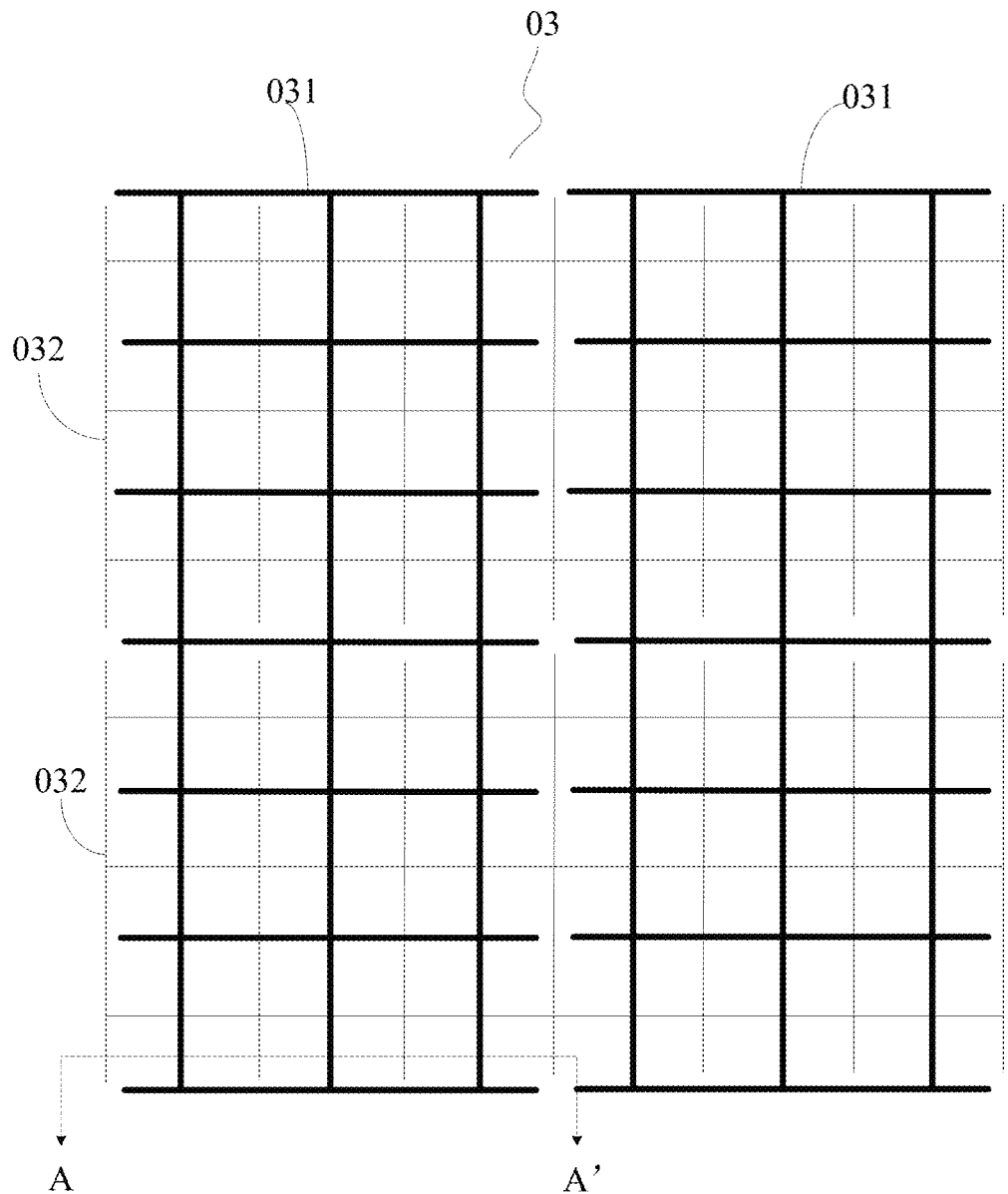
FIG. 1A is a first schematic structural diagram of the black matrix according to an embodiment of the disclosure.
Figure 1B:
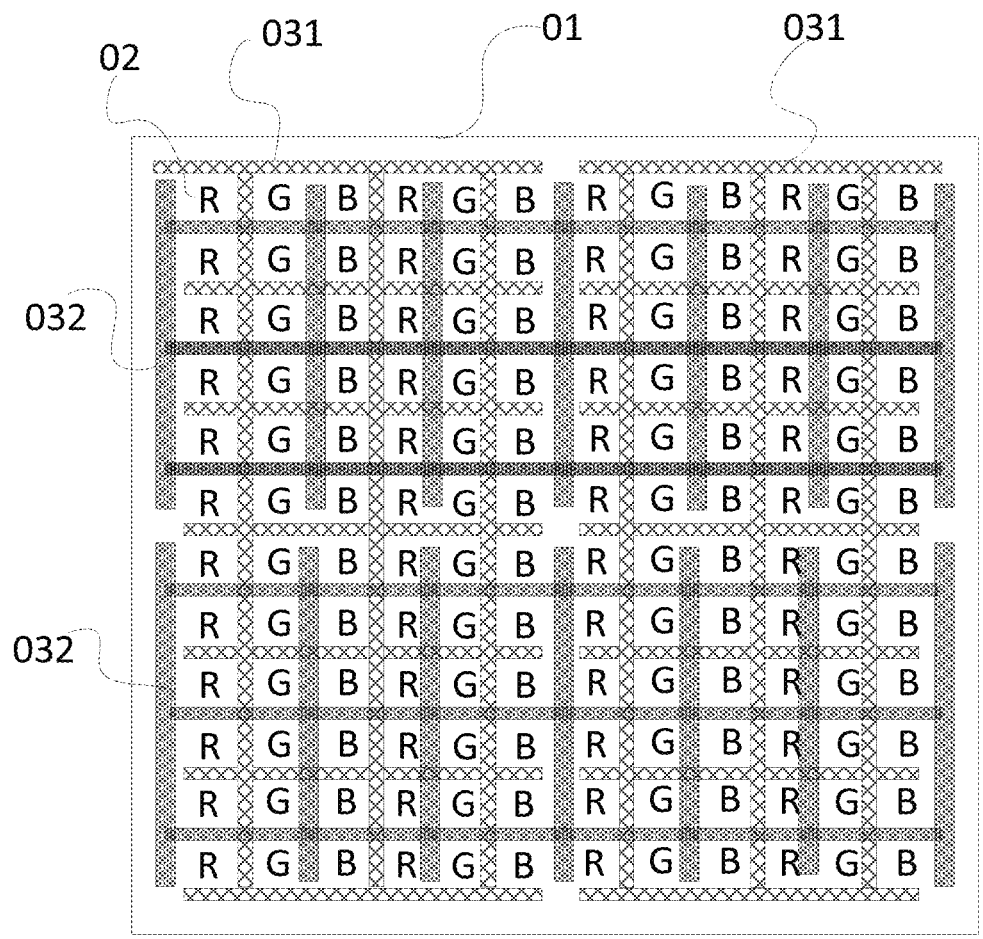
FIG. 1B is a schematic structural diagram of display substrate according to an embodiment of the disclosure.

In order to make the objects, technical solutions, and advantages of the disclosure more apparent, the disclosure will be described below in further details with reference to the drawings. Apparently the embodiments to be described are only a part but not all of the embodiments of the disclosure. Based upon the embodiments here of the disclosure, all of other embodiments which can occur to those ordinarily skilled in the art without any inventive effort shall come into the scope of the disclosure as claimed.

The shapes and sizes of components in the drawings are not intended to reflect any real proportion, but only intended to illustrate the content of the disclosure.

An embodiment of the disclosure provides a display substrate. As illustrated in FIG. 1A to FIG. 4, the display substrate includes: a base substrate 01, and a plurality of color photo-resist layers 02 and a black matrix 03 on the base substrate 01.

The orthographic projection of the black matrix 03 on the base substrate 01 covers orthographic projections of gaps between adjacent color photo-resist layers 02 on the base substrate 01.

The black matrix 03 includes: at least one first touch electrode 031 extending in a first direction, and at least one second touch electrode 032 extending in a second direction, where the first touch electrode 031 is insulated from the second touch electrode 032, and the first direction intersects with the second direction.

An orthographic projection of the first touch electrode 031 on the base substrate 01 and an orthographic projection of the second touch electrode 032 on the base substrate 01 covering orthographic projections of gaps between adjacent color photo-resist layers 02 on the base substrate 01.

Each first touch electrode 031 and each second touch electrode 032 are grid structures.

In the display substrate according to the embodiment of the disclosure, the first touch electrodes and the second touch electrodes, both of which are arranged to intersect with each other, are reused as the black matrix, so a separate process of fabricating the black matrix can be omitted, as compared with the display substrate in the related art, thus saving the fabrication cost and improving the fabrication efficiency.

Moreover the pattern of the black matrix is arranged in non-opening area of the pixels, thus avoiding the transmittance of a display device from being affected by touch electrodes.

In the display substrate according to the embodiment of the disclosure, one of the first touch electrode and the second electrode is the touch sensing electrode, and the other touch electrode are touch driving electrode, although the embodiment of the disclosure will not be limited thereto. When a touch scanning signal is applied to the touch driving electrode, the touch sensing electrode is coupled with the touch scanning signal, and outputs a touch sensing signal, thus resulting in a mutual-capacitive touch.

In some embodiments, the first direction is the row direction, and the second direction is the column direction, or the first direction is the column direction, and the second direction is the row direction.

In some embodiments, the display substrate can be an array substrate in a display panel, or can be a color filter substrate, arranged opposite to the array substrate, in the display panel, although the embodiment of the disclosure will not be limited thereto.

When the display substrate is an array substrate, thin film transistors, data lines, gate lines, pixel electrodes, etc., are generally further arranged on the display substrate. Of course, a common electrode can also be arranged on the array substrate, although the embodiment of the disclosure will not be limited thereto.

When the display substrate is a color filter substrate, a common electrode, a photo spacer, etc., can also be arranged on the display substrate, although the embodiment of the disclosure will not be limited thereto.

Figure 4:
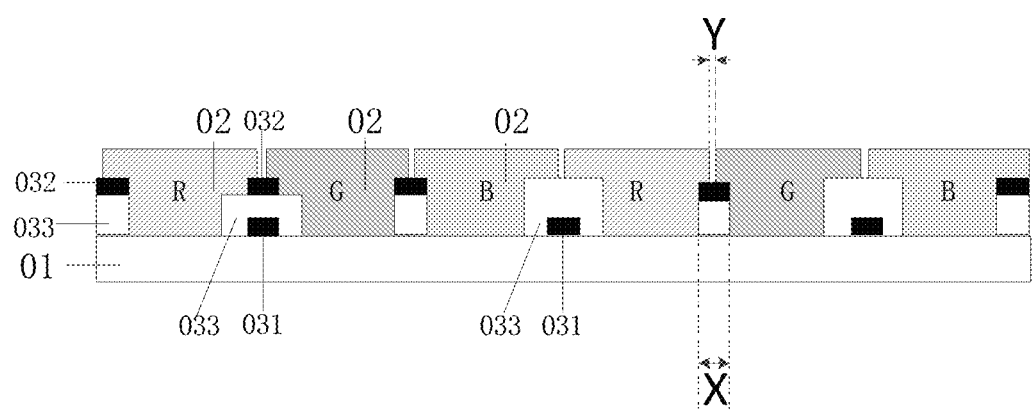
FIG. 4 is a schematic sectional view of the display substrate of FIG. 1A along AA'.

Optionally in the display substrate according to the embodiment of the disclosure, as illustrated in FIG. 4, the first touch electrodes 031 are arranged at a different layer from the second touch electrodes 032, and insulation layers 033 are arranged between the first touch electrodes 031 and the second touch electrodes 032.

As shown in FIG. 4, both the first touch electrodes 031 and the second touch electrodes 032 are configured between two adjacent color photo-resist layers 02. And, the width X of the first touch electrodes 032 is greater than the width Y of the gap between adjacent color photo-resist layers 02.

It shall be noted that FIG. 4 illustrates red photo-resist layers R, green photo-resist layers G, and blue photo-resist layers B arranged on the base substrate by way of an example, although the embodiment of the disclosure will not be limited thereto, and photo-resist layers in other colors can alternatively be arranged.

Figure 5:
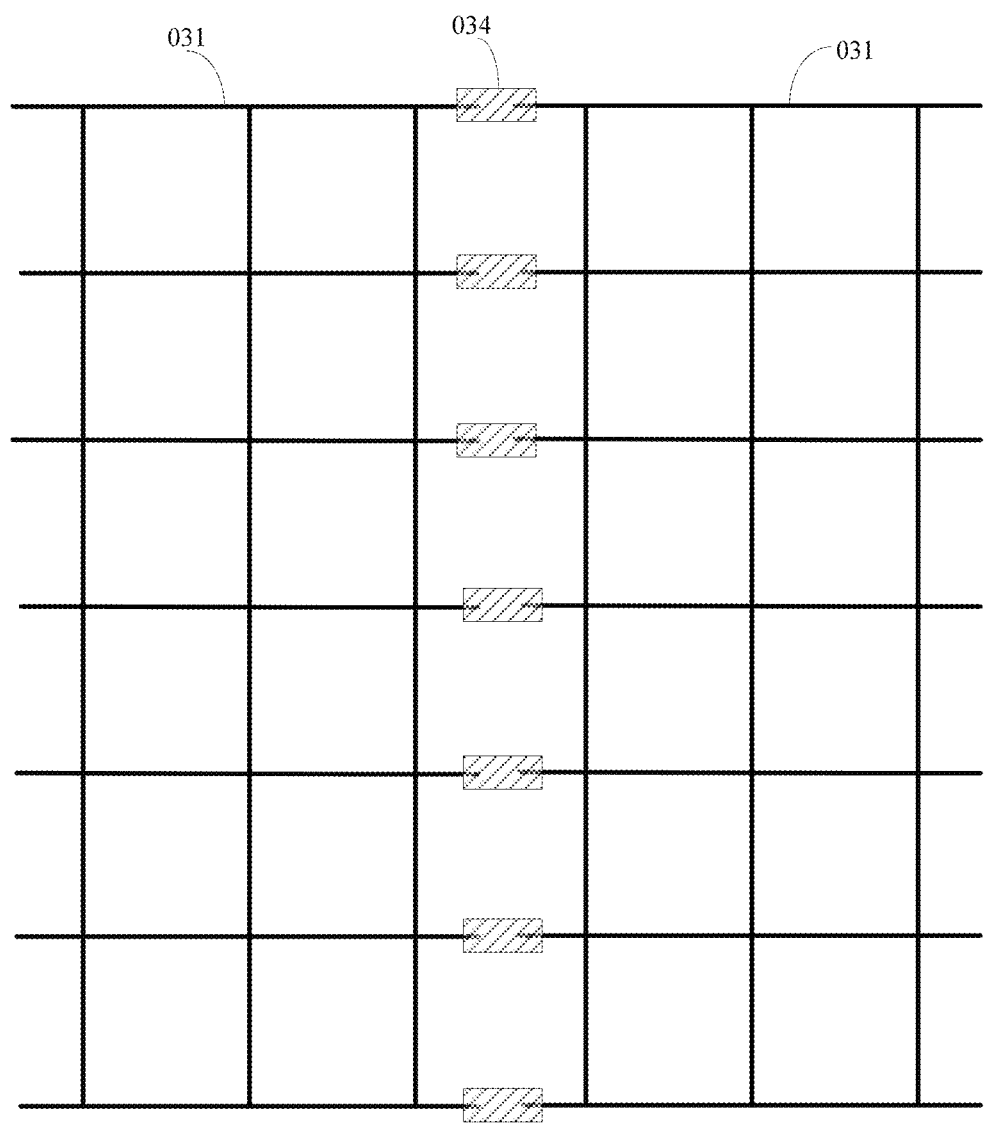
FIG. 5 is a schematic structural diagram of first touch electrodes and first light-shielding blocks according to an embodiment of the disclosure.
Figure 6:
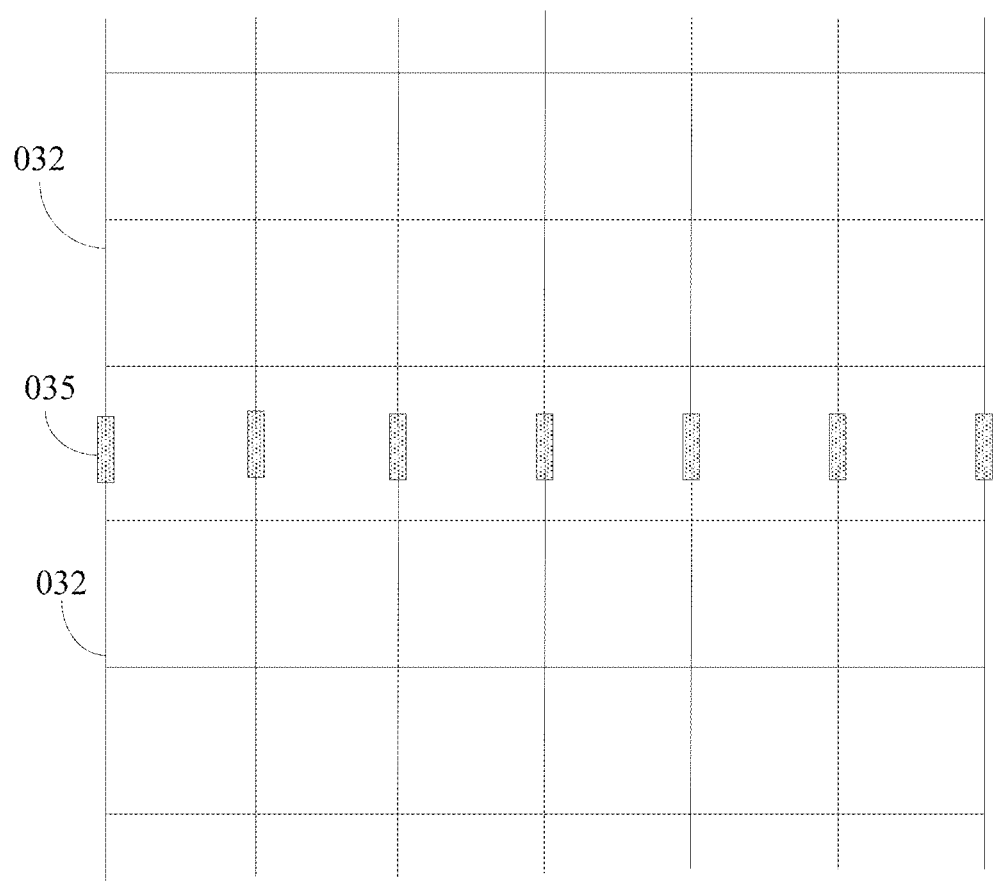
FIG. 6 is a schematic structural diagram of second touch electrodes and second light-shielding blocks according to an embodiment of the disclosure.
Figure 7:
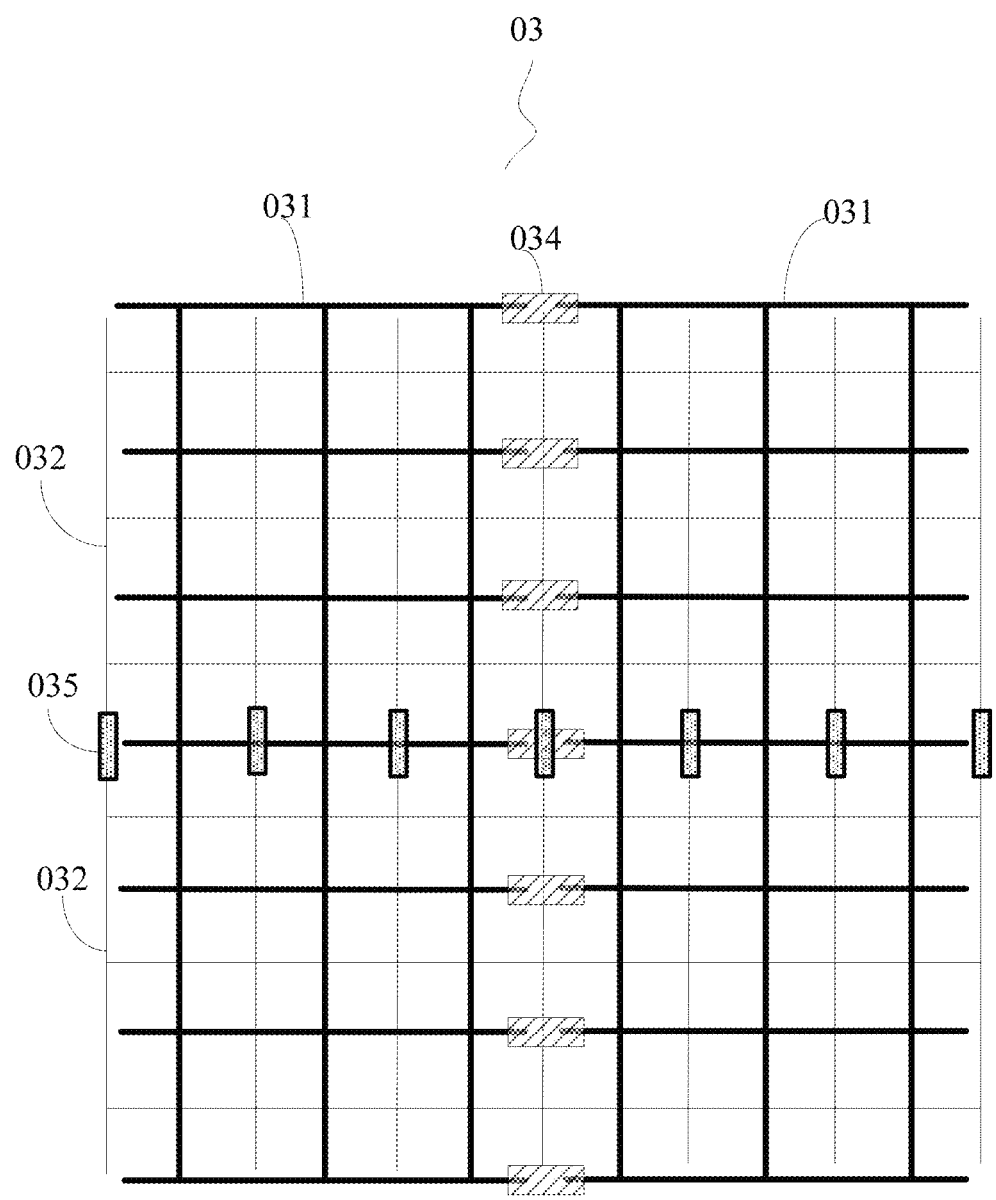
FIG. 7 is a second schematic structural diagram of the black matrix according to an embodiment of the disclosure.

In a specific implementation, in the display substrate according to the embodiment of the disclosure, one of the two grid layers insulated from each other is segmented into a plurality of first touch electrodes, and the other layer is segmented into a plurality of second touch electrodes. However in order to avoid light from being leaked from pixels on the display substrate through the cuts, optionally in the display substrate according to the embodiment of the disclosure, the black matrix further includes: first light-shielding blocks 034 located between adjacent first touch electrodes 031, and insulated from the first touch electrodes 031, as illustrated in FIG. 5; or second light-shielding blocks 035 located between adjacent second touch electrodes 032, and insulated from the second touch electrodes 032, as illustrated in FIG. 6; or first light-shielding blocks 034 located between adjacent first touch electrodes 031 and insulated from the first touch electrodes 031, and second light-shielding blocks 035 located between adjacent second touch electrodes 032 and insulated from the second touch electrodes 032, as illustrated in FIG. 7.

Figure 8:
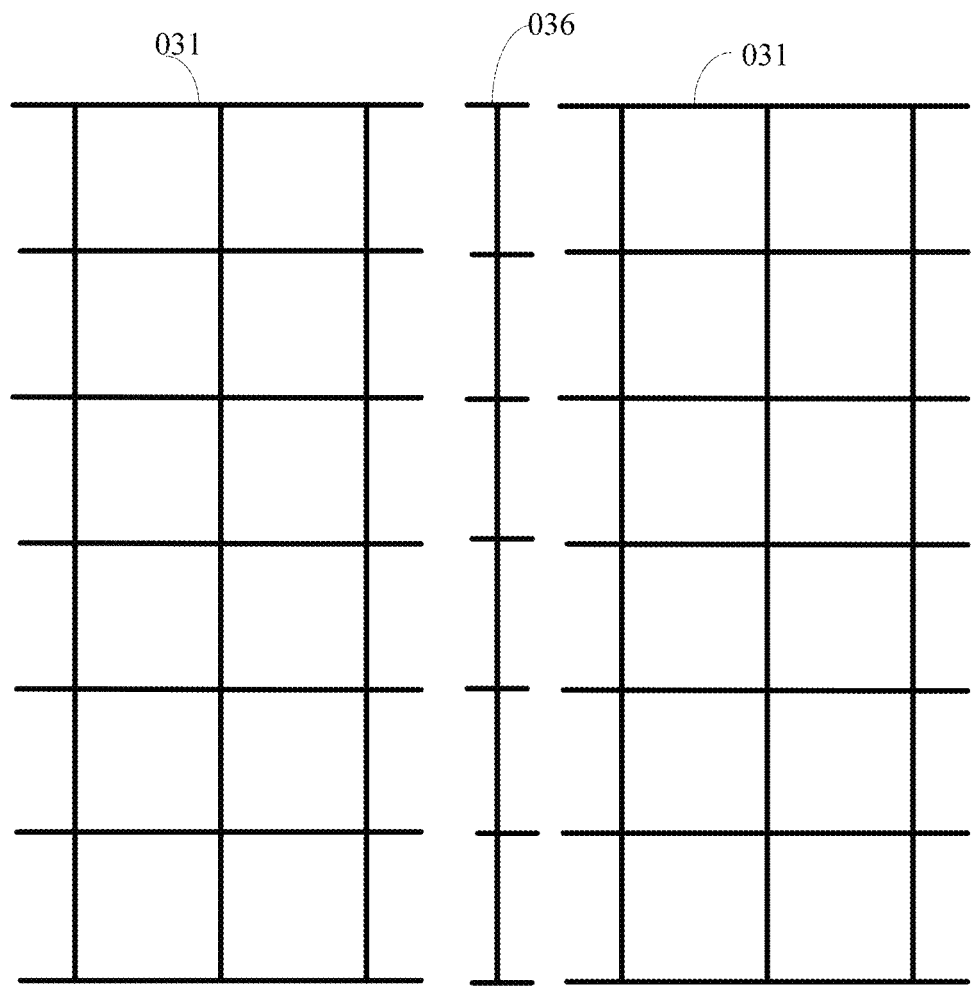
FIG. 8 is a schematic structural diagram of first touch electrodes and first dummy electrodes in a display substrate according to an embodiment of the disclosure.
Figure 9:
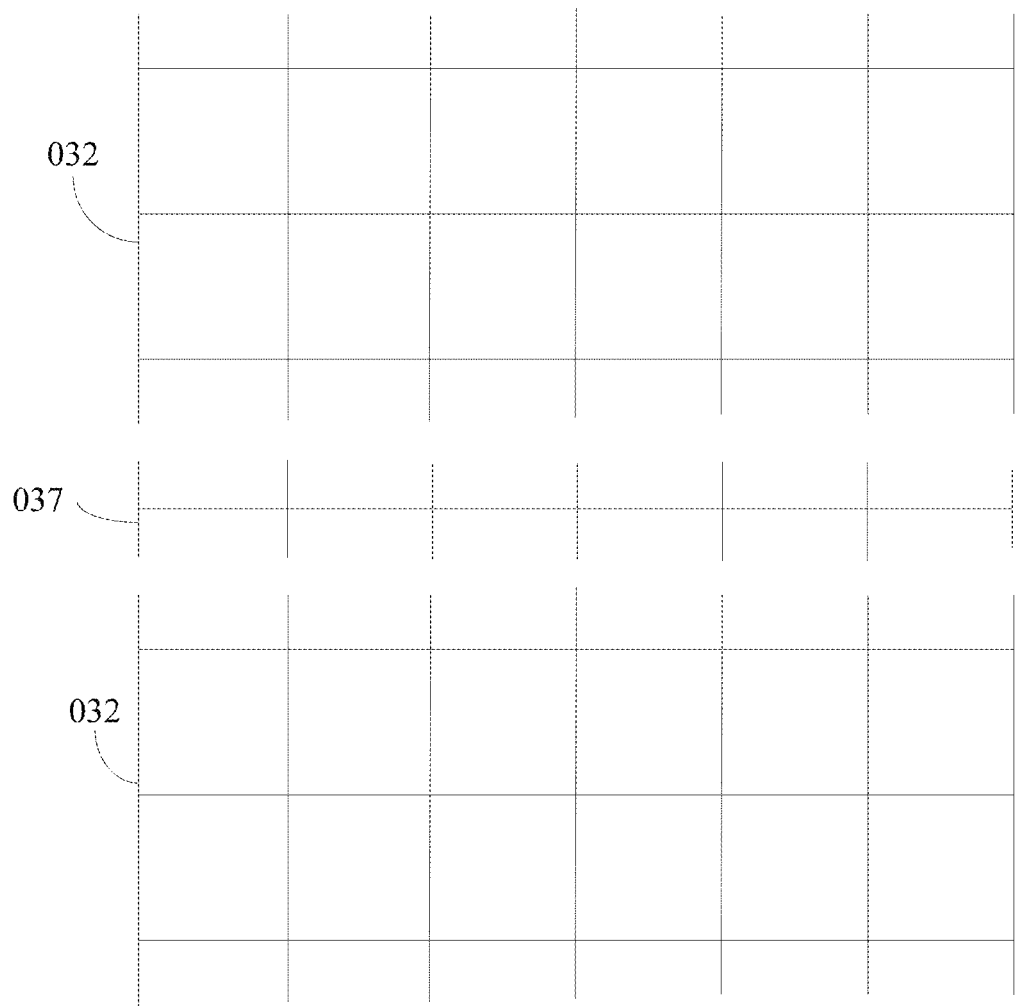
FIG. 9 is a schematic structural diagram of second touch electrodes and second dummy electrodes in a display substrate according to an embodiment of the disclosure.

In a specific implementation, in order to avoid adjacent touch electrodes from being short-circuited, the grid layers are segmented in such a way that some area is generally reserved between two adjacent touch electrodes as a dummy electrode, and the two adjacent touch electrodes are spaced from each other by the dummy electrode. Moreover the pattern of the dummy electrode is designed to be similar to the pattern of the touch electrode, to ensure uniformity of the display. In some embodiments, the dummy electrode is designed to be same as the pattern of the touch electrodes. Optionally in the display substrate according to the embodiment of the disclosure, the black matrix further includes: a first dummy electrode 036 located between adjacent first touch electrodes 031 and insulated from the first touch electrodes 031, as illustrated in FIG. 8; and/or a second dummy electrode 037 located between adjacent touch electrodes 032 and insulated from the second touch electrodes 032, as illustrated in FIG. 9.

In a specific implementation, no voltage is applied to the first dummy electrode during a touch to thereby avoid the adjacent first touch electrodes from being short-circuited therebetween. Alike no voltage is applied to the second dummy electrode during a touch to thereby avoid the adjacent second touch electrodes from being short-circuited therebetween.

Furthermore in a specific implementation, the shape of a first dummy electrode is determined by the arrangement of a color photo-resist layer between two adjacent first touch electrodes, and when there are a plurality of rows and/or columns of color photo-resist layers between the two adjacent first touch electrodes, the first dummy electrode generally also has a grid structure. Alike the shape of a second dummy electrode is determined by the arrangement of a color photo-resist layer between two adjacent second touch electrodes, and when there are a plurality of rows and/or columns of color photo-resist layers between the two adjacent second touch electrodes, the second dummy electrode generally also has a grid structure.

Figure 10:
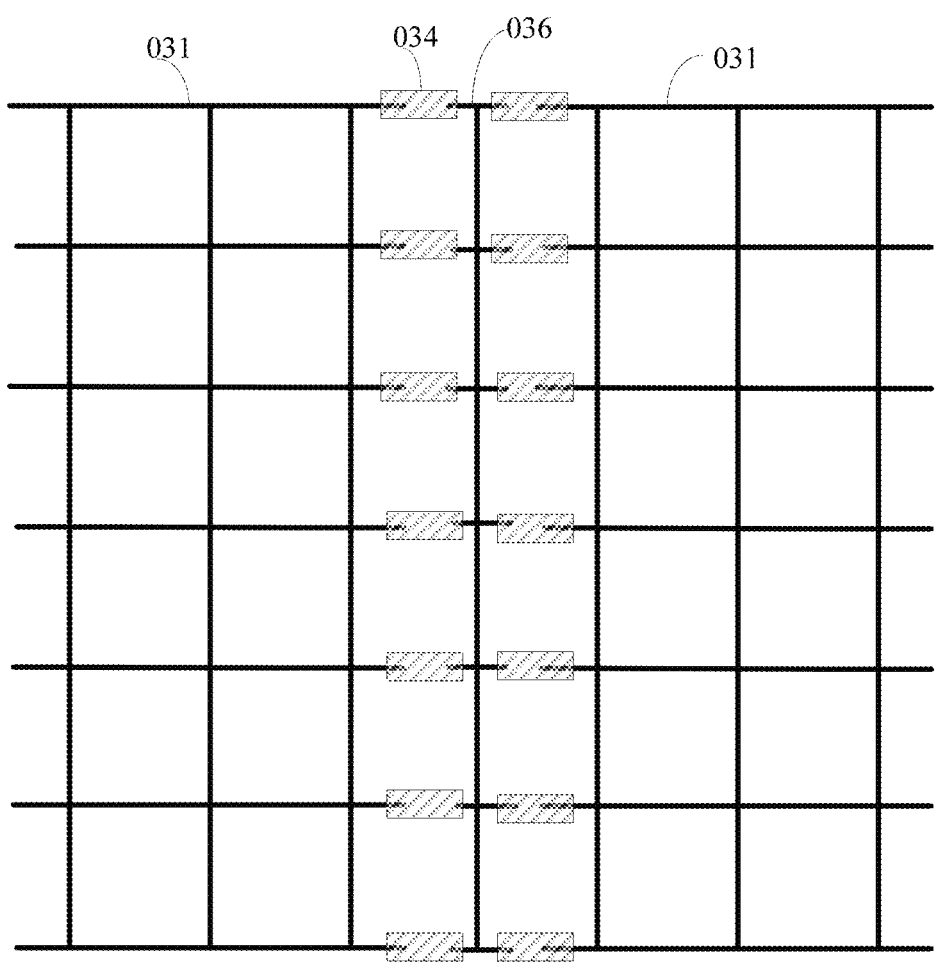
FIG. 10 is a schematic structural diagram of first touch electrodes, first dummy electrodes, and first light-shielding blocks according to an embodiment of the disclosure.
Figure 11:
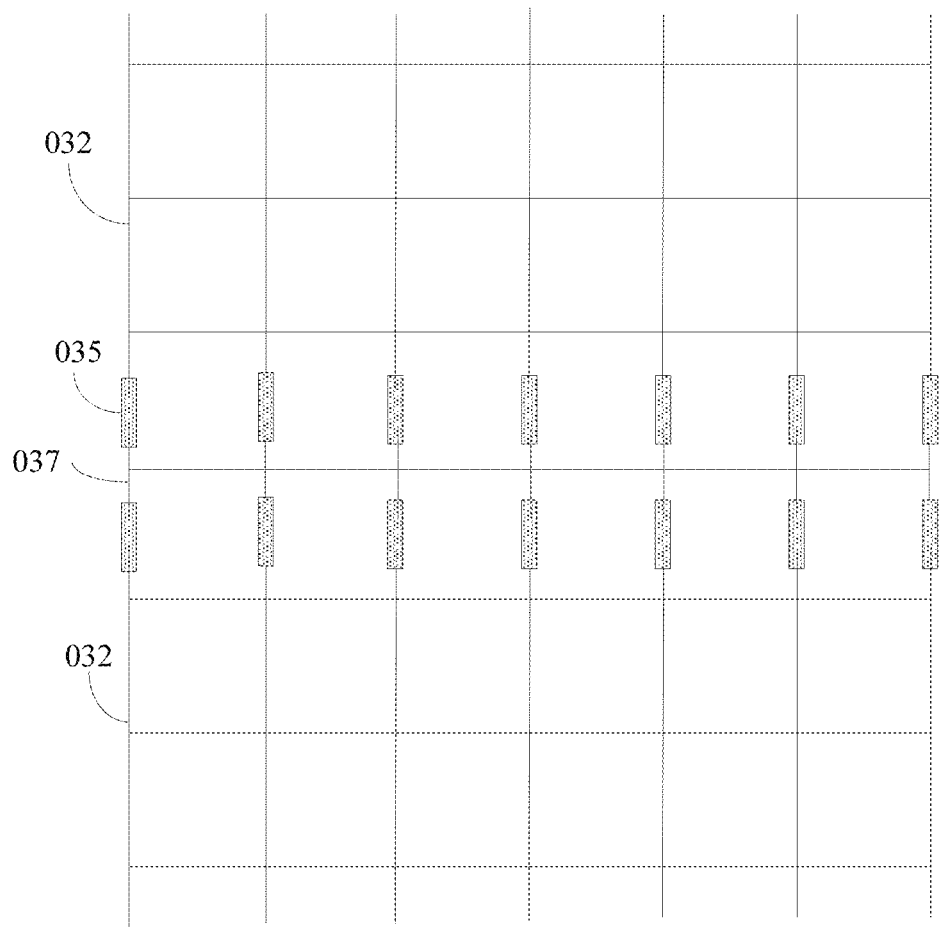
FIG. 11 is a schematic structural diagram of second touch electrodes, second dummy electrodes, and second light-shielding blocks according to an embodiment of the disclosure.

In order to avoid light from being leaked from pixels on the display substrate through the cuts between the touch electrodes and the dummy electrodes, optionally in the display substrate according to the embodiment of the disclosure, the black matrix further includes: first light-shielding blocks 034 located between adjacent first touch electrodes 031 and the first dummy electrode 036, and insulated from the first touch electrodes 031, as illustrated in FIG. 10; and/or second light-shielding blocks 035 located between adjacent second touch electrodes 032 and the second dummy electrode 039, and insulated from the second touch electrodes 032, as illustrated in FIG. 11.

Optionally in the display substrate according to the embodiment of the disclosure, the first light-shielding blocks are arranged at the same layer as the second touch electrodes so that the first light-shielding blocks and the second touch electrodes can be formed in the same patterning process to thereby reduce the number of process steps, and the first light-shielding blocks are arranged at the same layer as the second touch electrodes so that the first light-shielding blocks can be insulated from the first touch electrodes.

Alike optionally in the display substrate according to the embodiment of the disclosure, the second light-shielding blocks are arranged at the same layer as the first touch electrodes so that the second light-shielding blocks and the first touch electrodes can be formed in the same patterning process to thereby reduce the number of process steps, and the second light-shielding blocks are arranged at the same layer as the first touch electrodes so that the second light-shielding blocks can be insulated from the second touch electrodes.

In view of the precision of aligning the two layers, optionally in the display substrate according to the embodiment of the disclosure, the line width of the first light-shielding blocks is more than the line width of the grid in the second touch electrodes, and the line width of the second light-shielding blocks is more than the line width of the grid in the first touch electrodes.

In a specific implementation, the line width of the grid in the touch electrodes refers to the line width of a metal line of the grid, and specifically the line width of the metal lines forming the grid is controlled to range from 3 micrometers to 5 micrometers in the column direction, and from 9 micrometers to 11 micrometers in the row direction. Since an offset between the two aligned layers can be controlled within 1 micrometer, the width and the length of the light-shielding blocks can be increased by 2 micrometers. As illustrated in FIG. 5, for example, the length of the first light-shielding blocks 034 can be more than the width of the gaps between the adjacent first touch electrodes 031 corresponding thereto in position by 2 micrometers. In FIG. 5, since the first light-shielding blocks 034 extend in the row direction, the width of the first light-shielding blocks 034 can be more than the width of the grid line extending in the row direction in the first touch electrodes 031 by 2 micrometers. As illustrated in FIG. 6, for example, the length of the second light-shielding blocks 035 can be more than the width of the gaps between the adjacent second touch electrodes 032 corresponding thereto in position by 2 micrometers. In FIG. 6, since the second light-shielding blocks 035 extend in the column direction, the width of the second light-shielding blocks 035 can be more than the width of the grid line extending in the column direction in the second touch electrodes 032 by 2 micrometers.

Figure 1C:
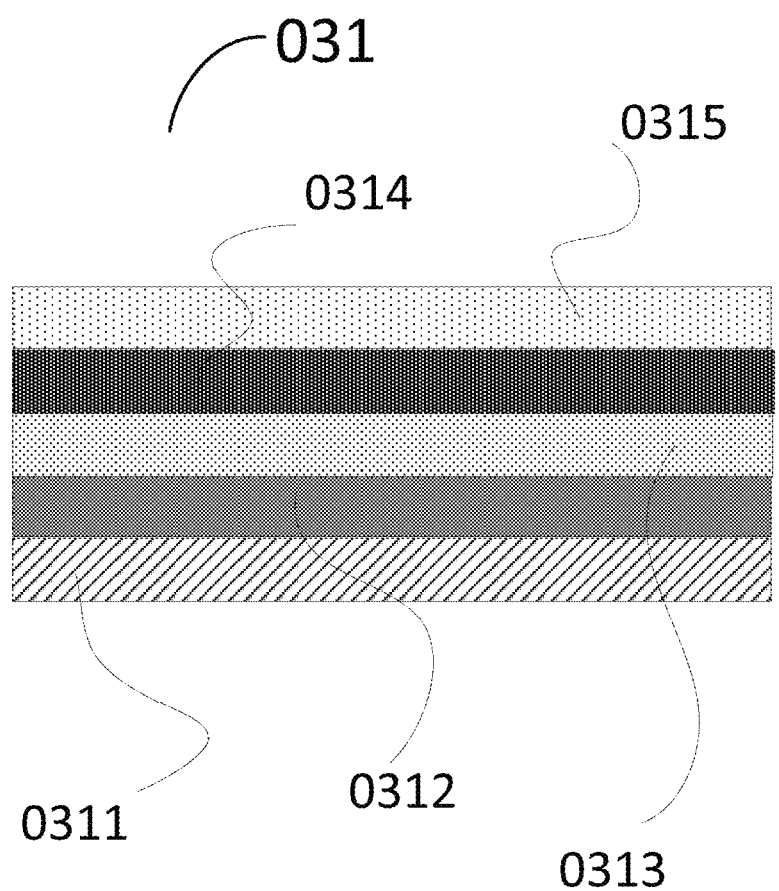
FIG. 1C is a schematic sectional view of the first touch electrode in a display substrate according to an embodiment of the disclosure.

Optionally in the display substrate according to the embodiment of the disclosure, as illustrated in FIG. 1C, the first touch electrode 031 includes a first blackened metal layer 0311, a first transition layer 0312, a metal layer 0313, a second transition layer 0314, and a second blackened metal layer 0314 stacked successively.

Figure 1D:
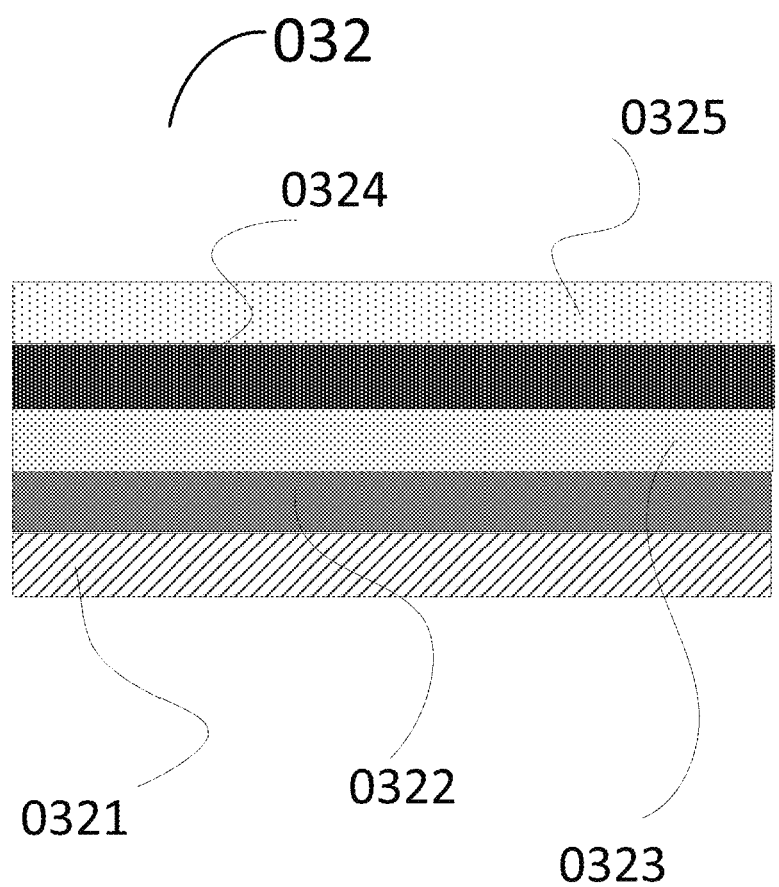
FIG. 1D is a schematic sectional view of the second touch electrode in a display substrate according to an embodiment of the disclosure.
Figure 2:
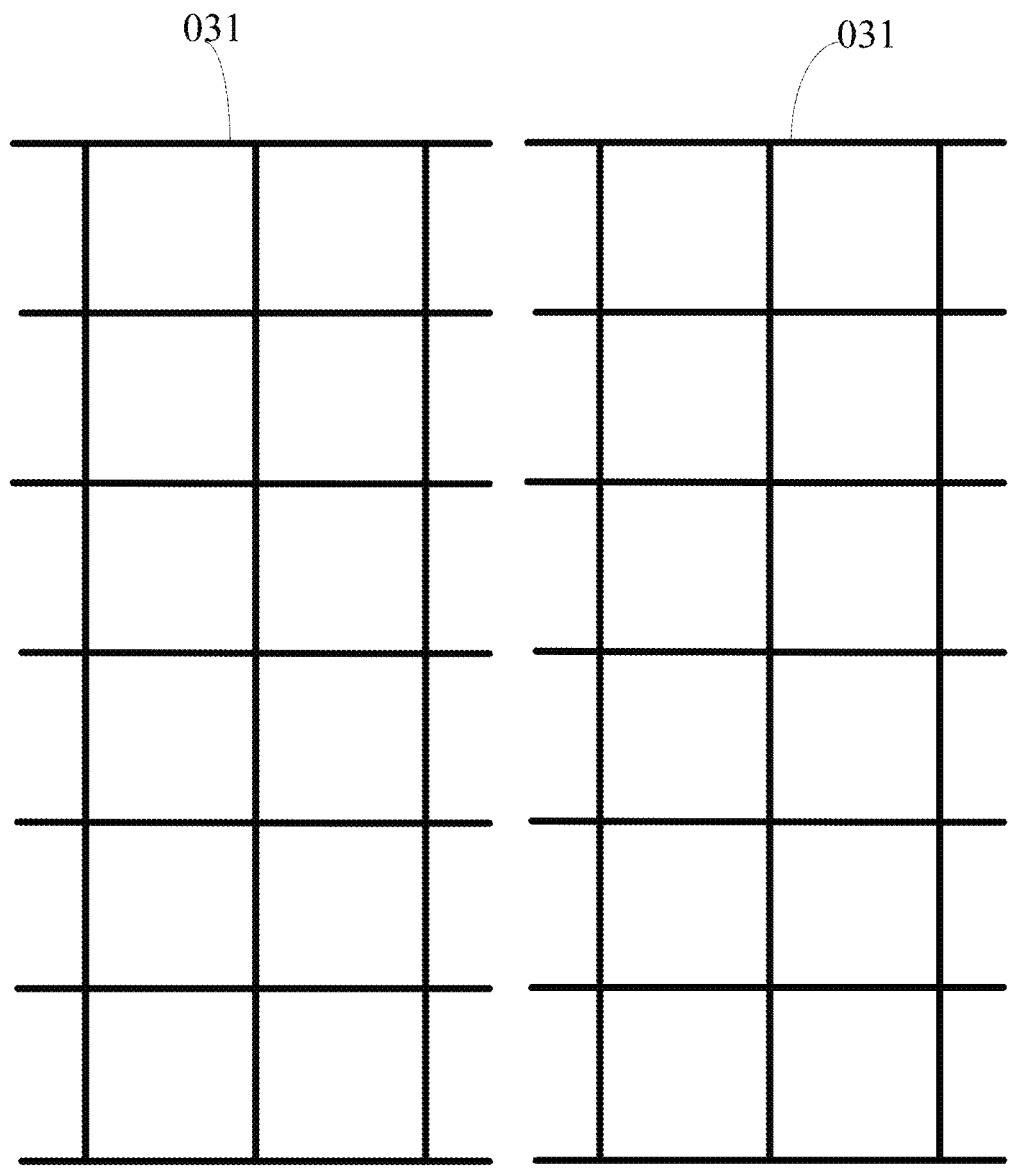
FIG. 2 is a schematic structural diagram of first touch electrodes in a display substrate according to an embodiment of the disclosure.
Figure 3:
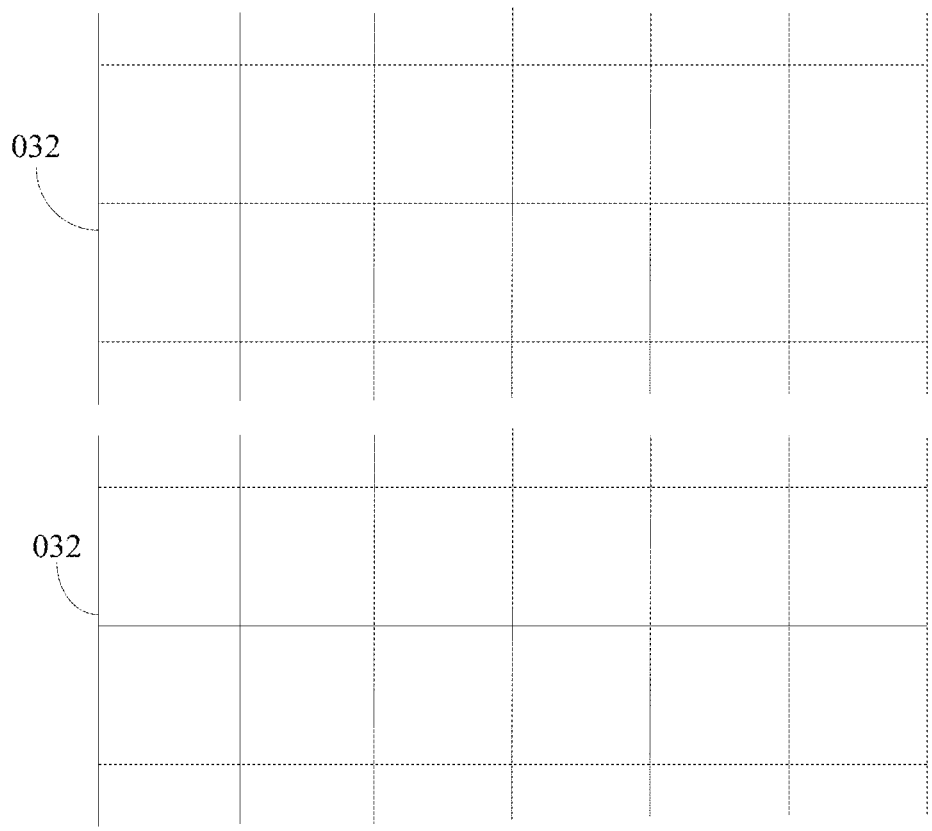
FIG. 3 is a schematic structural diagram of second touch electrodes in a display substrate according to an embodiment of the disclosure.

As illustrated in FIG. 1D, the second touch electrode 032 includes a first blackened metal layer 0321, a first transition layer 0322, a metal layer 0323, a second transition layer 0324, and a second blackened metal layer 0325 stacked successively.

In a specific implementation, the first blackened metal layer can be made of MoOx, MoOxNy, MoNbOx, or MoNbOxNy, etc., although the embodiment of the disclosure will not be limited thereto.

In a specific implementation, the first transition layer can be made of Mo, or MoNb, etc., although the embodiment of the disclosure will not be limited thereto.

In a specific implementation, the metal layer can be made of Al, AlNd, Cu, or CuNi, etc., although the embodiment of the disclosure will not be limited thereto.

In a specific implementation, the second transition layer can be made of Mo, MoNb, etc., although the embodiment of the disclosure will not be limited thereto.

In a specific implementation, the second blackened metal layer can be made of MoOx, MoOxNy, MoNbOx, or MoNbOxNy, etc., although the embodiment of the disclosure will not be limited thereto.

A process of fabricating the display substrate according to the embodiment of the disclosure will be described below.

Figure 12A:
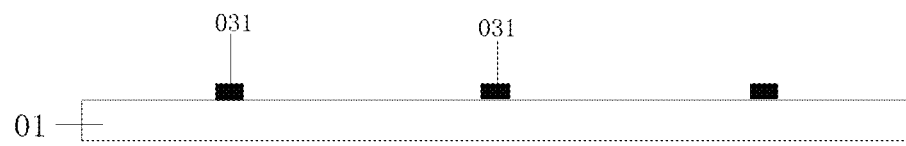
FIG. 12A to FIG. 12G are schematic structural diagrams respectively after respective steps in a flow of fabricating a display substrate according to an embodiment of the disclosure.
Figure 12B:
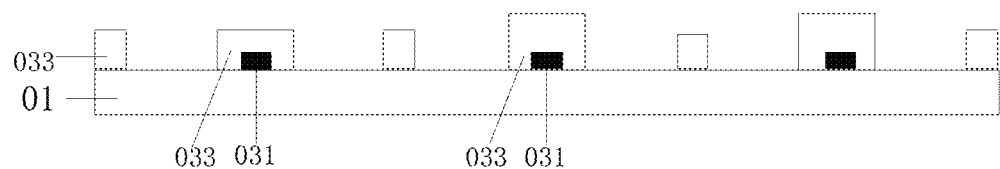

(1) A first electrode layer is formed on the base substrate 01 through Physical Vapor Deposition (PVD). The first electrode layer includes a first blackened metal layer (MoOx, MoOxNy, MoNbOx, or MoNbOxNy, etc.) with a thickness ranging from 10 nm to 100 nm and a reflectivity of less than 10% to light at the wavelength 550 nm, a first transition layer (Mo, MoNb, or Ti, etc.) with a thickness ranging from 10 nm to 100 nm, a metal layer (Al, AlNd, Cu, or CuNi, etc.) with a thickness ranging from 100 nm to 1000 nm, a second transition layer (Mo, MoNb, or Ti, etc.) with a thickness ranging from 10 nm to 100 nm, and a second blackened metal layer (MoOx, MoOxNy, MoNbOx, or MoNbOxNy, etc.) with a thickness ranging from 10 nm to 100 nm and a reflectivity of less than 10% to light at the wavelength 550 nm. Then photo-resist is coated, exposed, etched, and stripped, thus resulting in the first touch electrodes 031 in a grid structure, as illustrated in FIG. 12A.

In a specific implementation, the base substrate is initially rinsed to remove purity particles on the surface of the base substrate, before the first electrodes are formed on the base substrate.

(2) Organic insulating photo-resist is coated on the first metal grid layer, exposed and developed using a mask, and then baked, thus resulting in the pattern of the insulation layers 033, as illustrated in 12B.

In a specific implementation, the thickness of the insulation layer is controlled between 0.5 μm to 3 μm, although the embodiment of the disclosure will not be limited thereto. In view of the precision of alignment between the two layers, an offset between them is less than or equal to 1 μm, so the line width of the insulation layers 033 is more than the width of a grid line of the first touch electrodes 031 more than 2 μm.

The insulation layers 033 are configured to isolate the first touch electrodes from the second touch electrodes, and to protect the first touch electrodes from being etched by liquid etchant in a subsequent process.

Figure 12C:
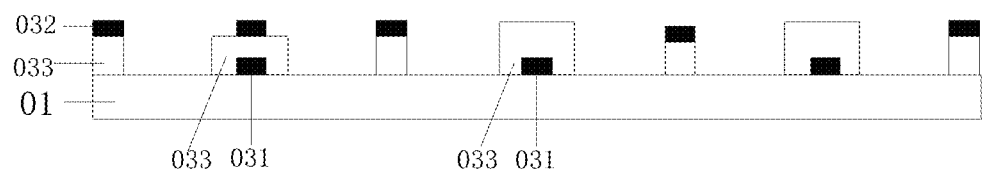

(3) A second electrode layer is formed through Physical Vapor Deposition (PVD), where the second electrode layer includes a first blackened metal layer (MoOx, MoOxNy, MoNbOx, or MoNbOxNy, etc.) with a thickness ranging from 10 nm to 100 nm and a reflectivity of less than 10% to light at the wavelength 550 nm, a first transition layer (Mo, MoNb, or Ti, etc.) with a thickness ranging from 10 nm to 100 nm, a metal layer (Al, AlNd, Cu, or CuNi, etc.) with a thickness ranging from 100 nm to 1000 nm, a second transition layer (Mo, MoNb, or Ti, etc.) with a thickness ranging from 10 nm to 100 nm, and a second blackened metal layer (MoOx, MoOxNy, MoNbOx, or MoNbOxNy, etc.) with a thickness ranging from 10 nm to 100 nm and a reflectivity of less than 10% to light at the wavelength 550 nm; and then photo-resist is coated, exposed, etched, and stripped, thus resulting in the second touch electrodes 032 in a grid structure, as illustrated in FIG. 12C.

Specifically both the first touch electrodes and the second touch electrodes form the black matrix.

In a specific implementation, in order to break channels between adjacent first touch electrodes, a part of the grid is cut off, and since light may be leaked at the cuts, the first light-shielding blocks are arranged at the second electrode layer at the cuts between the adjacent first touch electrodes. Alike in order to break channels between adjacent second touch electrodes, a part of the grid is cut off, and since light may be leaked at the cuts, the first light-shielding blocks are arranged at the first electrode layer at the cuts between the adjacent second touch electrodes.

Also in view of the precision of alignment between the two layers, the offset between them is less than or equal to 1 μm, so the light-shielding blocks at the cuts shall be compensated for, that is, the length of the light-shielding blocks is more than the length of the cuts by 2 μm, and the width of the light-shielding blocks is more than the width of grid lines corresponding thereto in position by 2 μm. In a specific implementation, the width of grid lines in the column direction is controlled at 4±1 μm, and the width of grid lines in the row direction is controlled at 10±1 μm.

Figure 12D:
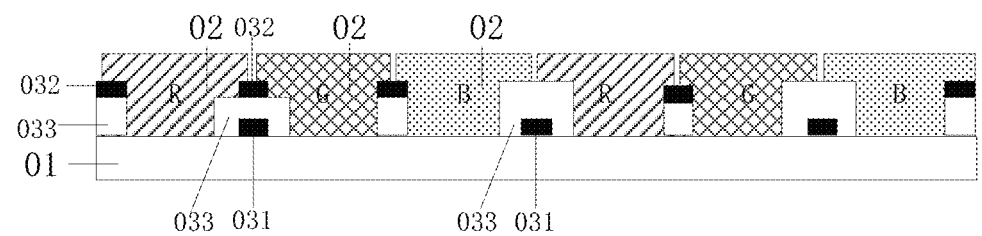

(4) Color photo-resist layers 02 in a pixel area are formed at hollow areas of the black matrix in a photolithograph process as illustrated in FIG. 12D, e.g., red photo-resist layers R, green photo-resist layers G, and blue photo-resist layers B.

Furthermore when the display substrate above is a color filter substrate, after the step (4), the process further includes the following steps.

Figure 12E:
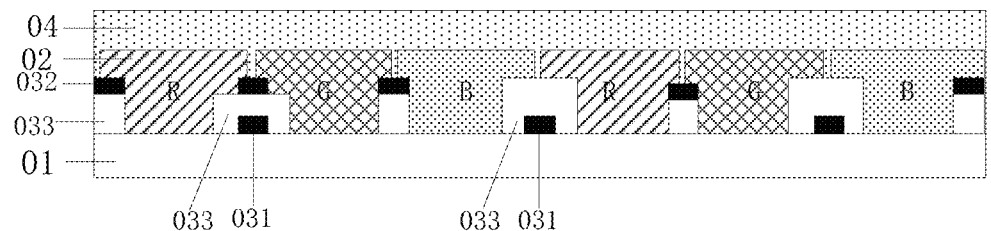

(5) A planarization layer 04 is formed on the color photo-resist layers 02 in a photolithograph process as illustrated in FIG. 12E.

Figure 12F:
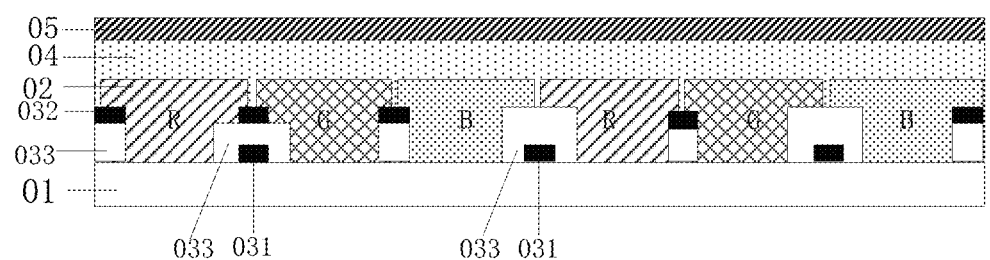

(6) A transparent electrode layer 05, e.g., made of Indium Tin Oxide (ITO), is deposited on the planarization layer 04 through Physical Vapor Deposition (PVD) as illustrated in FIG. 12F.

Figure 12G:
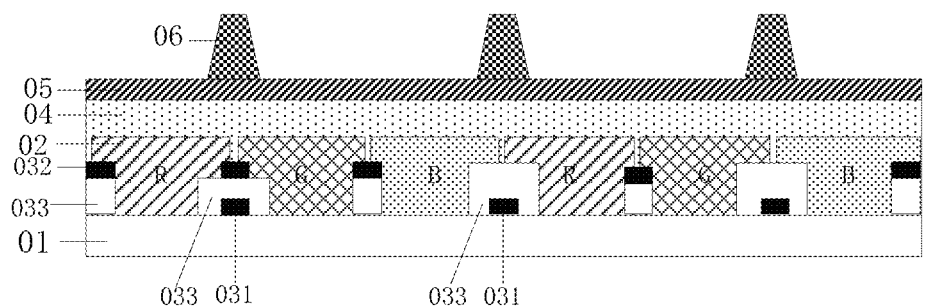

(7) Photo Spacers 06 (PSs) are formed on the surface of the transparent electrode layer 05 as illustrated in FIG. 12G.

In summary, the color filter substrate of the in cell touch panel as illustrated in FIG. 12G can be formed in only eight photolithograph processes. The color filter substrate include the first electrode layer, the insulation layer, the second electrode layer, the red photo-resist layer R, the photo-resist layer G, the blue photo-resist layer B, the planarization layer, the transparent electrode layer, and the photo spacers, where the transparent electrode layer is formed without a photolithograph process.

Figure 13:
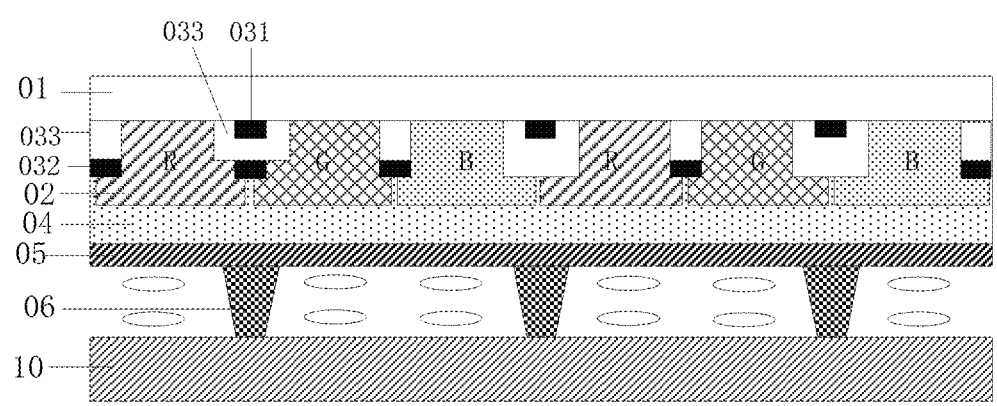
FIG. 13 is a schematic structural diagram of an in cell touch panel according to an embodiment of the disclosure.

In a specific implementation, the color filter substrate above is aligned with the array substrate 10, and liquid crystals are poured between them, UV-cured, etc., thus resulting in the in cell touch panel as illustrated in FIG. 13.

Based upon the same inventive idea, an embodiment of the disclosure further provides an in cell touch panel including an array substrate and an opposite substrate, both of which are arranged opposite to each other, where the black matrix is arranged on the side of the array substrate facing the opposite substrate, or the side of the opposite substrate facing the array substrate.

As illustrated in FIG. 1A, the black matrix 03 includes first touch electrodes 031 and second touch electrodes 032 insulated from each other, and intersecting with each other, and both the first touch electrodes 031 and the second touch electrodes 032 are in grid structures.

In the in cell touch panel according to the embodiment of the disclosure, the first touch electrodes and the second touch electrodes intersecting with each other are reused as the black matrix. A separate process of fabricating the black matrixes can be omitted as compared with the display substrate in the related art, thus saving the fabrication cost and improving the fabrication efficiency.

Optionally in the in cell touch panel according to the embodiment of the disclosure, the first touch electrodes 031 are arranged at a different layer from the second touch electrodes 032, and insulation layers 033 are arranged between the first touch electrodes 031 and the second touch electrodes 032, as illustrated in FIG. 4.

In a specific implementation, in order to avoid the first touch electrodes from being short-circuited with each other, there are gaps between adjacent first touch electrodes, and in order to avoid light from being leaked from pixels on the display substrate through the gaps, optionally in the in cell touch panel according to the embodiment of the disclosure, the black matrix further includes: first light-shielding blocks 034 located between adjacent first touch electrodes 031 and insulated from the first touch electrodes 031, as illustrated in FIG. 5; or second light-shielding blocks 035 located between adjacent second touch electrodes 032, and insulated from the second touch electrodes 032, as illustrated in FIG. 6; or first light-shielding blocks 034 located between adjacent first touch electrodes 031, and insulated from the first touch electrodes 031, and second light-shielding blocks 035 located between adjacent second touch electrodes 032, and insulated from the second touch electrodes 032, as illustrated in FIG. 7.

Optionally in the in cell touch panel according to the embodiment of the disclosure, the black matrix further includes: first dummy electrode(s) 036 located between adjacent first touch electrodes 031, and insulated from the first touch electrodes 031, as illustrated in FIG. 8; and/or second dummy electrode(s) 037 located between adjacent touch electrodes 032, and insulated from the second touch electrodes 032, as illustrated in FIG. 9.

In a specific implementation, no voltage is applied to the first dummy electrode during a touch to thereby avoid the adjacent first touch electrodes from being short-circuited therebetween. Alike no voltage is applied to the second dummy electrode during a touch to thereby avoid the adjacent second touch electrodes from being short-circuited therebetween.

In order to avoid light from being leaked from pixels on the display substrate through the cuts between the touch electrodes and the dummy electrodes, optionally in the display substrate according to the embodiment of the disclosure, the black matrix further includes: first light-shielding blocks 034 located between first touch electrodes 031 and first dummy electrode 036, and insulated from the first touch electrodes 031, as illustrated in FIG. 10; and/or second light-shielding blocks 035 located between second touch electrodes 032 and second dummy electrode 037, and insulated from the second touch electrodes 032, as illustrated in FIG. 11.

Optionally in the in cell touch panel according to the embodiment of the disclosure, the first light-shielding blocks are arranged at the same layer as the second touch electrodes so that the first light-shielding blocks and the second touch electrodes can be formed in the same patterning process to thereby reduce the number of process steps, and the first light-shielding blocks are arranged at the same layer as the second touch electrodes so that the first light-shielding blocks can be insulated from the first touch electrodes.

Optionally in the in cell touch panel according to the embodiment of the disclosure, the second light-shielding blocks are arranged at the same layer as the first touch electrodes so that the second light-shielding blocks and the first touch electrodes can be formed in the same patterning process to thereby reduce the number of process steps, and the second light-shielding blocks are arranged at the same layer as the first touch electrodes so that the second light-shielding blocks can be insulated from the second touch electrodes.

Optionally in the in cell touch panel according to the embodiment of the disclosure, the line width of the first light-shielding block is more than the line width of the grid of the second touch electrode, and the line width of the second light-shielding block is more than the line width of the grid of the first touch electrode.

In a specific implementation, the line width of the metal lines forming the grid is controlled to range from 3 micrometers to 5 micrometers in the column direction, and from 9 micrometers to 11 micrometers in the row direction. Since an offset between the two aligned layers can be controlled within 1 micrometer, the width and the length of the light-shielding blocks can be increased by 2 micrometers. As illustrated in FIG. 5, for example, the length of the first light-shielding blocks 034 can be more than the width of the gaps between the adjacent first touch electrodes 031 corresponding thereto in position by 2 micrometers. In FIG. 5, since the first light-shielding blocks 034 extend in the row direction, the width of the first light-shielding blocks 034 can be more than the width of the grid line extending in the row direction in the first touch electrodes 031 by 2 micrometers. As illustrated in FIG. 6, for example, the length of the second light-shielding blocks 035 can be more than the width of the gaps between the adjacent second touch electrodes 032 corresponding thereto in position by 2 micrometers. In FIG. 6, since the second light-shielding blocks 035 extend in the column direction, the width of the second light-shielding blocks 035 can be more than the width of the grid line extending in the column direction in the second touch electrodes 032 by 2 micrometers.

Optionally in the in cell touch panel according to the embodiment of the disclosure, the first touch electrode includes a first blackened metal layer, a first transition layer, a metal layer, a second transition layer, and a second blackened metal layer stacked successively.

The second touch electrode includes a first blackened metal layer, a second transition layer, a metal layer, a second transition layer, and a second blackened metal layer stacked successively.

In a specific implementation, the first blackened metal layer can be made of MoOx, MoOxNy, MoNbOx, or MoNbOxNy, etc., although the embodiment of the disclosure will not be limited thereto.

In a specific implementation, the first transition layer can be made of Mo, or MoNb, etc., although the embodiment of the disclosure will not be limited thereto.

In a specific implementation, the metal layer can be made of Al, AlNd, Cu, or CuNi, etc., although the embodiment of the disclosure will not be limited thereto.

In a specific implementation, the second transition layers can be made of Mo, MoNb, etc., although the embodiment of the disclosure will not be limited thereto.

In a particular implementation, the second blackened metal layer can be made of MoOx, MoOxNy, MoNbOx, or MoNbOxNy, etc., although the embodiment of the disclosure will not be limited thereto.

Optionally in the in cell touch panel according to the embodiment of the disclosure, a plurality of pixel elements are arranged in a matrix on the array substrate.

The first direction is the row direction of the pixel elements, and the second direction is the column direction of the pixel elements.

Or, the first direction is the column direction of the pixel elements, and the second direction is the row direction of the pixel elements.

Optionally in the in cell touch panel according to the embodiment of the disclosure, the in cell touch panel further includes color photo-resist layers.

Both the color photo-resist layers and the black matrix are located on the side of the array substrate facing the opposite substrate, or both the color photo-resist layers and the black matrix are located on the side of the opposite substrate facing the array substrate.

Based upon the same inventive idea, an embodiment of the disclosure further provides a display device including the in-cell touch panel above according to the embodiment of the disclosure, and the display device can be a mobile phone, a tablet computer, a TV set, a display, a notebook computer, a digital camera, a navigator, or any other product or component with a display function. Reference can be made to the embodiment of the in-cell touch panel above for an implementation of the display device, so a repeated description thereof will be omitted here.

In the display substrate, the in cell touch panel, and the display device according to the embodiments of the disclosure, the black matrix includes the first touch electrodes and the second touch electrodes insulated from each other, and intersecting with each other, and both the first touch electrodes and the second touch electrodes are in grid structures, that is, the first touch electrodes and the second touch electrodes arranged to intersect with each other are reused as the black matrix, so a separate process of fabricating the black matrixes can be omitted as compared with the display substrate in the related art, thus saving the fabrication cost and improving the fabrication efficiency.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A display substrate, comprising:
a base substrate, and
a plurality of color photo-resist layers and a black matrix on the base substrate, an orthographic projection of the black matrix on the base substrate covering orthographic projections of gaps between adjacent color photo-resist layers on the base substrate;
wherein the black matrix comprises: at least one first touch electrode extending in a first direction, and at least one second touch electrode extending in a second direction, the first touch electrode is insulated from the second touch electrode, and the first direction intersects with the second direction;
an orthographic projection of the first touch electrode on the base substrate and an orthographic projection of the second touch electrode on the base substrate covering orthographic projections of gaps between adjacent color photo-resist layers on the base substrate;
each of the at least one first touch electrode and each of the at least one second touch electrode have grid structures;
the first touch electrode is arranged at a different layer from the second touch electrode, and an insulation layer is arranged between the first touch electrode and the second touch electrode;
the first touch electrode comprises a first blackened metal layer, a first transition layer, a metal layer, a second transition layer, and a second blackened metal layer stacked successively; and
the second touch electrode comprises a first blackened metal layer, a first transition layer, a metal layer, a second transition layer, and a second blackened metal layer stacked successively.

2. The display substrate according to claim 1, wherein the black matrix further comprises at least one of:
- a first light-shielding block between adjacent first touch electrodes, and insulated from the first touch electrodes; or
- a second light-shielding block between adjacent second touch electrodes, and insulated from the second touch electrodes.

3. The display substrate according to claim 1, wherein the black matrix further comprises at least one of:
- a first dummy electrode between adjacent first touch electrodes, and insulated from the first touch electrodes; or
- a second dummy electrode between adjacent second touch electrodes, and insulated from the second touch electrodes.

4. The display substrate according to claim 3, wherein the black matrix further comprises at least one of:
- a first light-shielding block between adjacent first touch electrode and the first dummy electrode, and insulated from the first touch electrodes; or
- a second light-shielding block between adjacent second touch electrode and the second dummy electrode, and insulated from the second touch electrode.

5. The display substrate according to claim 2, wherein the first light-shielding block is arranged at a same layer as the second touch electrode; and
the second light-shielding block is arranged at a same layer as the first touch electrode.

6. The display substrate according to claim 5, wherein a line width of the first light-shielding block is more than a line width of a grid of the second touch electrode; and
a line width of the second light-shielding block is more than a line width of a grid of the first touch electrode.

7. An in cell touch panel, comprising an array substrate and an opposite substrate, both of which are opposite to each other, a black matrix being arranged on a side of the array substrate facing the opposite substrate, or a side of the opposite substrate facing the array substrate, a plurality of color photo-resist layers, and an orthographic projection of the black matrix on the base substrate covering orthographic projections of gaps between adjacent color photo-resist layers on the base substrate;
wherein the black matrix comprises: at least one first touch electrode extending in a first direction, and at least one second touch electrode extending in a second direction, the first touch electrode is insulated from the second touch electrode, and the first direction intersects with the second direction;
an orthographic projection of the first touch electrode on the base substrate and an orthographic projection of the second touch electrode on the base substrate covering orthographic projections of gaps between adjacent color photo-resist layers on the base substrate;
each of the at least one first touch electrode and each of the at least one second touch electrode have grid structures;
electrode, and an insulation layer is arranged between the first touch electrode and the second touch electrode;
the first touch electrode comprises a first blackened metal layer, a first transition layer, a metal layer, a second transition layer, and a second blackened metal layer stacked successively; and
the second touch electrode comprises a first blackened metal layer, a first transition layer, a metal layer, a second transition layer, and a second blackened metal layer stacked successively.

8. The in cell touch panel according to claim 7, wherein the black matrix further comprises at least one of:
- a first light-shielding block between adjacent first touch electrodes, and insulated from the first touch electrodes; or
- a second light-shielding block between adjacent second touch electrodes, and insulated from the second touch electrodes.

9. The in cell touch panel according to claim 7, wherein the black matrix further comprises at least one of:
- a first dummy electrode between adjacent first touch electrodes, and insulated from the first touch electrodes; or
- a second dummy electrode between adjacent second touch electrodes, and insulated from the second touch electrodes.

10. The in cell touch panel according to claim 9, wherein the black matrix further comprises at least one of:
- a first light-shielding block between adjacent first touch electrode and the first dummy electrode, and insulated from the first touch electrode; or
- a second light-shielding block between adjacent second touch electrode and the second dummy electrode, and insulated from the second touch electrode.

11. The in cell touch panel according to claim 8, wherein the first light-shielding block is arranged at a same layer as the second touch electrode; and
the second light-shielding block is arranged at a same layer as the first touch electrode.

12. The in cell touch panel according to claim 11, wherein a line width of the first light-shielding block is more than a line width of a grid of the second touch electrode; and
a line width of the second light-shielding block is more than a line width of a grid of the first touch electrode.

13. The in cell touch panel according to claim 7, further comprising a color photo-resist layer;
wherein both the color photo-resist layer and the black matrix are on a side of the array substrate facing the opposite substrate, or both the color photo-resist layer and the black matrix are on a side of the opposite substrate facing the array substrate.

14. A display device, comprising the in cell touch panel according to claim 7.

* * * * *

UNITED STATES PATENT AND TRADEMARK OFFICE
CERTIFICATE OF CORRECTION

PATENT NO. : 11,016,592 B2
APPLICATION NO. : 16/399259
DATED : May 25, 2021
INVENTOR(S) : Liuyue Yin et al.

Page 1 of 1

It is certified that error appears in the above-identified patent and that said Letters Patent is hereby corrected as shown below:

On the Title Page

Item (71) Applicant Reads:
"Hefei Xinsheng Optoelectronics Technology Co., Ltd.; BOE Technology Group Co., Ltd., Beijing (CN)"

Should read:
-- Hefei Xinsheng Optoelectronics Technology Co., Ltd., Hefei (CN); BOE Technology Group Co., Ltd., Beijing (CN) --, therefor.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*